(12) United States Patent
Nambu et al.

(10) Patent No.: US 7,555,127 B2
(45) Date of Patent: Jun. 30, 2009

(54) QUANTUM CRYPTOGRAPHY KEY DISTRIBUTION SYSTEM AND METHOD

(75) Inventors: Yoshihiro Nambu, Tokyo (JP); Toshiyuki Kambe, Tokyo (JP)

(73) Assignee: NEC Corporation, Tokyo (JP)

( * ) Notice: Subject to any disclaimer, the term of this patent is extended or adjusted under 35 U.S.C. 154(b) by 795 days.

(21) Appl. No.: 10/369,601

(22) Filed: Feb. 21, 2003

(65) Prior Publication Data

US 2003/0169880 A1    Sep. 11, 2003

(30) Foreign Application Priority Data

Feb. 22, 2002    (JP) ............................. 2002-046187

(51) Int. Cl.
*H04K 1/00*    (2006.01)
(52) U.S. Cl. .................. 380/256; 380/44; 380/277; 380/278; 380/279; 380/182; 380/189; 713/168
(58) Field of Classification Search .................. 380/44, 380/256, 278, 21, 49, 277, 263, 279; 385/3; 398/182, 189; 713/150
See application file for complete search history.

(56) References Cited

U.S. PATENT DOCUMENTS

| | | | | |
|---|---|---|---|---|
| 4,995,690 A * | 2/1991 | Islam | ............................. | 385/8 |
| 5,074,631 A * | 12/1991 | Hamano et al. | ................. | 385/3 |
| 5,307,410 A * | 4/1994 | Bennett | ....................... | 380/256 |
| 5,311,592 A * | 5/1994 | Udd | ............................. | 380/256 |
| 5,473,459 A * | 12/1995 | Davis | ......................... | 398/141 |
| 5,515,438 A * | 5/1996 | Bennett et al. | ............... | 380/278 |
| 5,757,912 A * | 5/1998 | Blow | ............................ | 380/256 |
| 5,761,351 A * | 6/1998 | Johnson | ....................... | 385/15 |
| 5,764,765 A * | 6/1998 | Phoenix et al. | ............. | 380/283 |
| 6,028,935 A * | 2/2000 | Rarity et al. | ................. | 380/256 |
| 6,233,070 B1 * | 5/2001 | Lu et al. | ......................... | 359/9 |
| 6,272,224 B1 * | 8/2001 | Mazourenko et al. | ........ | 380/283 |
| 6,317,526 B1 * | 11/2001 | Shirasaki et al. | ................ | 385/3 |
| 6,522,749 B2 * | 2/2003 | Wang | .......................... | 380/263 |
| 6,657,727 B1 * | 12/2003 | Izatt et al. | .................... | 356/450 |
| 6,678,379 B1 * | 1/2004 | Mayers et al. | ............... | 380/278 |
| 6,744,793 B2 * | 6/2004 | Stoner et al. | .................. | 372/32 |

(Continued)

FOREIGN PATENT DOCUMENTS

JP    3-126911 A    5/1991

(Continued)

OTHER PUBLICATIONS

Charles H. Bennett, Quantum Cryptography Using Any Two Nonorthogonal States, Physical Review Letters, vol. 68, No. 21, 1992, pp. 3121-3124.*

(Continued)

*Primary Examiner*—Nasser G Moazzami
*Assistant Examiner*—Shanto M Abedin
(74) *Attorney, Agent, or Firm*—Foley & Lardner LLP

(57) ABSTRACT

In a quantum cryptography key distribution system for sharing a secret key between a transmitter and a receiver site, an unbalanced interferometer system in the transmitter site has a Mach-Zehnder interferometer switch with a phase modulator while the receiver site records photon arrival time slots. The system utilizes a whole of arrival photons in the receiver site and dispenses with any phase modulator in the receiver site. This system serves to improve a photon utilization efficiency.

19 Claims, 4 Drawing Sheets

U.S. PATENT DOCUMENTS

| | | | |
|---|---|---|---|
| 6,801,626 B1 * | 10/2004 | Nambu | 380/256 |
| 6,826,371 B1 * | 11/2004 | Bauch et al. | 398/188 |
| 6,856,401 B1 * | 2/2005 | Rønnekleiv | 356/477 |
| 7,068,790 B1 * | 6/2006 | Elliott | 380/278 |
| 7,266,304 B2 * | 9/2007 | Duraffourg et al. | 398/151 |
| 7,346,166 B2 * | 3/2008 | Inoue et al. | 380/263 |
| 7,403,623 B2 * | 7/2008 | Cerf et al. | 380/278 |
| 2002/0097874 A1 * | 7/2002 | Foden et al. | 380/256 |
| 2004/0052373 A1 * | 3/2004 | Debuisschert | 380/255 |
| 2004/0086280 A1 * | 5/2004 | Duraffourg et al. | 398/186 |
| 2005/0074245 A1 * | 4/2005 | Griffin | 398/188 |

FOREIGN PATENT DOCUMENTS

| | | |
|---|---|---|
| JP | 2000-286841 A | 10/2000 |
| JP | 2000-324100 A | 11/2000 |

OTHER PUBLICATIONS

K. Inoue et al, Differential-phase-shift quantum key distribution using coherent light, The American Physical Society, 2003, pp. 1-4.*

Zbinden et al., "Experimental Quantum Cryptography," *Introduction to Quantum Computation and Information*, (1998), World Scientific Publishing Co. Pte. Ltd., Singapore, pp. 120-141.

A. Ekert, "Quantum Cryptography," *The Physics of Quantum Information*, (2000) Springer, Heidelberg, Germany, pp. 15-48.

* cited by examiner

QUANTUM CRYPTOGRAPHY KEY DISTRIBUTION SYSTEM AND METHOD

BACKGROUND OF THE INVENTION

This invention relates to a method and a system for keeping information secret by the use of a cryptography technique and, in particular, to the method and the system for use in sharing a secret key between two remote systems. Herein, it is to be noted here throughout the instant specification that such a secret key is helpful as an absolutely or unconditionally safe cryptography key and is formed on the basis of a quantum cryptography protocol.

Heretofore, various protocols have been proposed as quantum key distribution protocols, for example, for cryptography using four non-orthogonal states, cryptography using two non-orthogonal states, cryptography using quantum interference between two photons, cryptography using time difference interference. Such protocols have been described in detail in Japanese Patent Unexamined Publication No.2000-286841 (Reference 1) and therefore will not been explained later.

Now, it should be noted that this invention is concerned with the quantum cryptography key distribution protocol using the four non-orthogonal states, among the above-enumerated protocols. The quantum cryptography key distribution protocol may be simply called the four state protocol BB84, as pointed out in Reference 1. The four state protocol BB84 would be implemented by a first way of using four non-orthogonal polarization states as the four non-orthogonal states or a second way of using four non-orthogonal states represented by superposition of quantum wave packets composed of a small number of photons having different time and space characteristics.

Both of the ways have been strongly studied and developed for practical use and have been mentioned in "Experimental Quantum Cryptography" written on page 120 et seq by Hugo Zbinden et al in a book entitled "INTRODUCTION TO QUANTUM COMPUTATION AND INFORMATION" (edited by Hoi-Kwong Lo et al and published by World Scientific in 1998) and also in "Quantum Cryptography" written on page 15 et seq by A. Ekert in the book "The Physics of Quantum Information (edited by D. Bouwmeester et al and published by Springer in 2000)".

As regards the four state protocol BB84, the first way of using the four non-orthogonal polarization states is advantageous in that secure and equal bulk polarizers can be used in an encoder and a decoder included in a transmitter and a receiver, respectively. However, the first way needs a control operation of tracking polarization states on the transmitter and the receiver and makes it difficult to reduce a size of each device in the transmitter and the receiver because of using the bulk polarizers. Moreover, an optical loss inevitably becomes large when the first way is used.

On the other hand, the second way of using the four non-orthogonal states represented by superposition of the quantum wave packets composed of a small number of photons having the different time and space characteristics dispenses with polarization control and is capable of reducing an optical loss. In addition, the second way is advantageous in that wave-guide elements of small sizes can be used in an encoder and a decoder included in a transmitter and a receiver. However, the second way encounters a difficulty of structuring secure and equal interferometer systems, although this difficulty can be overcome by forming such interferometer system devices by solid-state monolithic devices.

Under the circumstances, vigorous studies have been continued about possibilities of both the first and the second ways in Europe, USA, and Domestic research and development organizations for the time being.

The following description will be made only about a conventional technique for carrying out the second way because this invention is concerned with the second way.

The conventional technique or system according to the second way is disadvantageous in that utilization efficiency of photons (may be called photon utilization efficiency) arriving at the receiver is reduced about to 0.5 and phase modulators should be included in both the transmitter and the receiver. As a result, an optical loss of 3 dB should be unconditionally caused to occur at the receiver on observation of the photons with time because of presence of the phase modulator included in the receiver.

SUMMARY OF THE INVENTION

It is an object of this invention to provide a quantum cryptography key distribution system or method which is suitable for quantum key distribution by using four non-orthogonal states represented by superposition of quantum wave packets each of which is composed of a single photon having different time and space characteristics.

It is another object of this invention to provide a quantum cryptography key distribution system or method of the type described, which can avoid an optical loss caused to occur a phase modulator in a receiver site.

It is still another object of this invention to provide a quantum cryptography key distribution system or method of the type described, which can utilize the photons with efficiency of 1 that may be called photon utilization efficiency.

It is yet another object of this invention to provide a method of transmitting a quantum signal with great photon utilization efficiency from a transmitter site to a receiver site.

It is another object of this invention to provide a transmitter site which is effective to transmit a quantum signal with great photon utilization efficiency and which can dispense with a phase modulator in a receiver site.

A quantum cryptography key distribution system to which this invention applicable is for use in sharing a secret key between a transmitter site and a receiver site on the basis of a quantum cryptography key distribution protocol of four non-orthogonal states that are represented by superposition of quantum wave packet states each consisting of a single photon with different time and space characteristics. According to a first aspect of this invention, the transmitter site comprises an unbalanced interferometer system having two different optical paths, a light splitting portion, and a light coupling portion and a Mach-Zehnder interferometer switch which is located at either one of the light splitting portion and the light coupling portion and which includes a phase modulator. The receiving comprises photon detectors and a recording device for recording photon detection times at which the photon is received by each of the photon detectors.

The above-mentioned Mach-Zehnder interferometer switch is located at the light splitting portion or the light coupling portion.

The phase modulator is supplied with a pair of phase modulation values selected from $(0, \pi)$ and $(\pi/2, 3\pi/2)$ to phase modulate a light pulse. The transmitter site produces, as the photon, single photons that are different in time and space from each other and that correspond to the phase modulation values of each pair.

Preferably, the unbalanced interferometer system may be a Mach-Zehnder interferometer system having a long arm and a short arm. In this case, the single photons modulated by the phase modulator are given to the long arm and the short arm of the Mach-Zehnder interferometer system.

More specifically, the transmitter site transmits, through a quantum channel to the receiver site, the photon which is specified by single photon packet states selected from ($|s>_A$, $|l>_A$) and ($|l>_A+|s>_A$, $|l>_A-|s>_A$) in response to the phase modulation values (0, π) and (π/2, 3π/2).

In this case, the receiver site communicable with the transmitter site comprises a Mach-Zehnder interferometer portion free from a phase modulator. Specifically, the Mach-Zehnder interferometer portion of the receiver site comprises a long arm, a short arm, a first coupler located on an input side, and a second coupler located on an output side. The photon detectors is for detecting the photon sent through the second coupler and are supplied with gate signals composed of three continuous pulses to define three time slots for detecting the photon and detects the photon only when the gate signals are given.

In this case, the three continuous time slots may be composed of a middle time slot and satellite time slots before and after the middle time slot. The photon of the single photon packet states ($|l>_A+|s>_A$, $|l>_A-|s>_A$) is received within the middle time slot while the photon of the single photon packet state ($|s>_A$, $|l>_A$) is received within the satellite time slots.

Preferably, the recording device in the receiver site records not only the photon received by the receiver site but also the middle and the satellite time slots as the photon detection times.

According to a second aspect of this invention, a transmitter site is for use in a quantum cryptography key distribution system to transmit a quantum signal to a receiver site by using four non-orthogonal states of single photons. The transmitter site comprises an unbalanced interferometer system having two different optical paths, a light splitting portion, and a light coupling portion and a Mach-Zehnder interferometer switch which is located at either one of the light splitting portion and the light coupling portion and which includes a phase modulator and an output device for outputting, as the quantum signal, each single photon that is subjected to phase modulation by the phase modulator and that is specified by single photon packet states different in time and space from one another and determined by the phase modulation.

The phase modulator is supplied with a pair of phase modulation values selected from (0, π) and (π/2, 3π/2) to phase modulate a light pulse and the transmitter site produces, as the quantum signal, the single photons that correspond to the phase modulation values of each pair.

Preferably, the unbalanced interferometer system of the transmitter site is a Mach-Zehnder interferometer system having a long arm and a short arm. The single photons modulated by the phase modulator are given to the long arm and the short arm of the Mach-Zehnder interferometer system.

The transmitter site may transmit, through a quantum channel to the receiver site, the quantum signal which is specified by the single photon packet states selected from ($|s>_A$, $|l>_A$) and ($|l>_A+|s>_A$, $|l>_A-|s>_A$) in response to the phase modulation values (0, π) and (π/2, 3π/2).

According to a third aspect of this invention, a receiver site is communicable with the above-mentioned transmitter site and comprises a Mach-Zehnder interferometer portion responsive to the quantum signal and free from a phase modulator to produce a photon and photon detectors for detecting the photon from the Mach-Zehnder interferometer portion.

The above-mentioned Mach-Zehnder interferometer portion of the receiver site comprises a long arm, a short arm, a first coupler located on an input side, and a second coupler located on an output side. The photon detectors serve to detect the photon sent through the second coupler and are supplied with gate signals composed of three continuous pulses to define three time slots for detecting the photon and detects the photon only when the gate signals are given. Specifically, the three continuous time slots are composed of a middle time slot and satellite time slots before and after the middle time slot. The photon of the single photon packet states ($|l>_A+|s>_A$, $|l>_A-|s>_A$) is received within the middle time slot while the photon of the single photon packet state ($|s>_A$, $|l>_A$) is received within the satellite time slots.

In this event, the recording device in the receiver site records not only the photon received by the receiver site but also the middle and the satellite time slots as the photon detection times.

According to a fourth aspect of this invention, a method is for transmitting a quantum signal in the form of a single photon from a transmitter site to a receiver site. The single photon is specified by single photon packet states that are non-orthogonal to one another. The method comprises the steps of phase modulating a light pulse by phase modulation values by a phase modulator included in the transmitter site to produce two light output signals subjected to the phase modulation and different in amplitude from each other, allowing the two light output signal to pass through a long arm and a short arm of an unbalanced interferometer system to obtain the single photon that is determined by the phase modulation values and the long and the short arms and that are different in time and space from one another, and producing each of the signal photons as the quantum signal.

According to a fifth aspect of this invention, a method is for transmitting a quantum signal in the form of a single photon from a transmitter site to a receiver site. The single photon is specified by single photon packet states that are non-orthogonal to one another. The method comprises the steps of allowing a light pulse to pass through a long arm and a short arm of an unbalanced interferometer system to obtain light output pulses different in time from each other, phase modulating the light output pulses by phase modulation values by a phase modulator included in the transmitter site to produce the single photon that is determined by the phase modulation values and the long and the short arms and that is specified by the single photon packet states.

The method according to the fourth and the fifth aspects of this invention preferably comprises the steps of receiving the quantum signal through a long arm and a short arm of an unbalanced interferometer portion to produce photons different in time from one another, detecting the photons within three continuous time slots, and recording the photons together with the received time slots.

DESCRIPTION OF PREFERRED EMBODIMENTS

Figure 1:
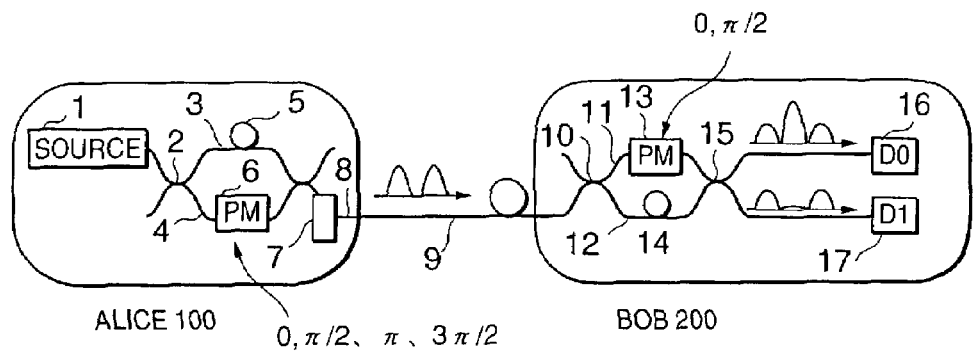
FIG. 1 shows a diagrammatical view of a conventional quantum cryptography key distribution system.

Referring to FIG. 1, description will be made about a conventional system or method for quantum key distribution for a better understanding of this invention. The illustrated system has a transmitter site 100 and a receiver site 200, both of which are shown on the left-hand and the right-hand sides of FIG. 1 and will be simply called Alice and Bob, respectively, as widely used in the art.

The transmitter site 100 has a light or an optical source 1 for periodically generating an optical signal in the form of a sequence of coherent light pulses. The optical signal is separated or split by a 3 dB coupler 2 to be delivered to a long path (or arm) 3 and a short path (or arm) 4, both of which serve as an unbalanced Mach-Zehnder interferometer together with the 3 dB coupler 2. In the long arm 3, an optical delay path 5 is inserted while a phase modulator 6 is inserted in the short arm 4. In the phase modulator 6, each optical pulse periodically received from the light source 1 is phase modulated by a value $\theta_A$ that is selected from four values, namely, $0, \pi/2, \pi,$ and $3\pi/2$ generated at random. In this event, results of the phase modulation alone are left as phase modulation values in the transmitter site (Alice) 100.

The optical signal, namely, laser pulse sequence is split into the long and the short arms 3 and 4 and allowed to pass through the long and the short arms 3 and 4 to be combined together by a 3 dB coupler 7. The combined laser pulse is attenuated by an attenuator 8 into faint laser pulses having an average number of photon per pulse, namely, an average photon number of about 0.1 to be sent to the receiver site, namely, Bob 200 through a quantum channel 9.

In the receiver site (Bob) 200, the received faint laser pulses are branched or split by a 3 dB coupler 10 to be delivered to a long arm 12 and a short arm 11 both of which are operable as an unbalanced Mach-Zehnder interferometer in combination with the 3 dB coupler 10. An optical delay path 14 is identical in length with the optical delay path 5 and inserted in the long arm 12 while a phase modulator 13 is inserted in the short arm 11.

The illustrated phase modulator 13 is supplied with a value $\theta_B$ that is selected from two values, namely, $0$ and $\pi/2$ given at random and also with faint optical pulses periodically received from the light source 1. The phase modulator 13 phase modulates the received faint optical pulses by the selected value $\theta_B$. In the illustrated example, only phase modulation values are recorded to be left in the receiver site (Bob) 200.

Thereafter, the faint optical pulses which are allowed to pass through the long and the short arms 12 and 11 are combined together by a 3 dB coupler 15 to be delivered as output light signals to both single photon detectors 16 and 17. Responsive to the output light signals, the single photon detectors 16 and 17 produce photon detection results which are recorded by the receiver site 200.

Now, description will be made about a principle of the above-mentioned conventional system or apparatus. When the case where no photon is detected during photon measurement is ignored in the following description, a quantum state of each faint optical pulse transmitted from Alice 100 is approximately represented by superposition of a single-photon state $|l\rangle_A$ passing through the long arm 3 of Alice 100 and a single-photon state $|s\rangle_A$ passing through the short arm 4 of Alice 100. Namely, such a superposed quantum state is given by:

$$|\Psi(\theta_A)\rangle = \frac{1}{\sqrt{2}}(|l\rangle_A + e^{i\theta_A}|s\rangle_A) \quad (1)$$

Among the quantum states corresponding to $\theta_A = 0, \pi/2, \pi,$ and $3\pi/2$, the following states are orthogonal to each other;

$$|\Psi(0)\rangle = \frac{1}{\sqrt{2}}(|l\rangle_A + |s\rangle_A) \text{ and } |\Psi(0)\rangle = \frac{1}{\sqrt{2}}(|l\rangle_A - |s\rangle_A).$$

In addition, the next following states are also orthogonal to each other;

$$\left|\Psi\left(\frac{\pi}{2}\right)\right\rangle = \frac{1}{\sqrt{2}}(|l\rangle_A + i|s\rangle_A) \text{ and } \left|\Psi\left(\frac{3\pi}{2}\right)\right\rangle = \frac{1}{\sqrt{2}}(|l\rangle_A - i|s\rangle_A)$$

Thus, two state sets or pairs are given by:

$$\{|\Psi(0)\rangle, |\Psi(\pi)\rangle\} \text{ and } \{|\Psi(\pi/2)\rangle, |\Psi(3\pi/2)\rangle\}.$$

Each set is defined by a complete base system of a two-dimensional quantum state space concerned with the quantum wave packet states $|s\rangle_A$ and $|l\rangle_A$. The quantum wave packet states $|s\rangle_A$ and $|l\rangle_A$ serve to define each of the single photons having different time and space characteristics. This means that the single photons of the quantum wave packet states $|s\rangle_A$ and $|l\rangle_A$ are generated within different times or time slots. In addition, both the base systems of the two state sets are non-orthogonal to each other. This makes it possible to apply the four state protocol BB84 to the above-mentioned four quantum wave packet states that will be often called four quantum states later.

Next, description will be made about an operation of a device included in the receiver site or Bob 200. Bob 200 has an unbalanced Mach-Zehnder interferometer system with an optical path difference between two arms that are accurately equal to those of Alice 100.

Herein, it is to be noted that a single photon is transmitted from Alice 100 to Bob 200 through first, second, and third optical paths different in length from one another. The first path may include both the long arms of Alice 100 and Bob 200 while the second path may include either a first combination of the long arm of Alice 100 and the short path of Bob 200 or a second combination of the short arm of Alice 100 and the long arm of Bob 200. The first combination is equal to the second combination in length. Furthermore, the third path may include the short arms of Alice 100 and Bob 200.

Each single photon has a single-photon state dependent on each path and can be specified by the quantum state determined by the arm or arms.

Taking the above into consideration, a single-photon state that passes through the long arm 3 of Alice's interferometer system and the short arm 13 of Bob's interferometer system can be represented by ($|l>_A|s>_B$) while a single-photon state that passes through the short arm 4 of Alice and the long arm 14 of Bob can be represented by ($|s>_A|l>_B$). The former single-photon state ($|l>_A|s>_B$) and the latter single-photon state ($|s>_A|l>_B$) appear in Bob 200 through the first and the second combinations in the second path that have the same lengths.

From this fact, it is readily understood that the single-photon state ($|l>_A|s>_B$) overlaps in time and space with the single-photon state ($|s>_A|l>_B$) on the 3 dB coupler 15 of Bob 200 and, as a result, interference takes place between both the single-photon states ($|l>_A s>_B$) and ($s>_A|l>_B$).

Figure 2:
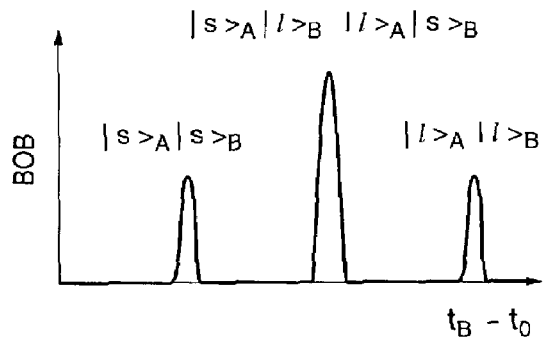
FIG. 2 shows a time chart for use in describing photon detection time slots in a receiver site (Bob)

Referring to FIG. 2, detection signals of photons (photon detection signals) observed by Bob 200 are diagrammatically illustrated with respect to a photon detection time. Herein, it is to be noted that there are probabilities that photons possibly arrive at three different time slots determined by the first through the third paths. In other words, the first through the third paths are determined by two arms through which the photons pass in Alice's and Bob's interferometer systems. This means that the photons are detected by the detectors 16 and 17 at the three different time slots that are determined by combinations of the two arms on Alice and Bob and that may be called left, middle, and right time slots in FIG. 2. As shown in FIG. 2, the left and the right time slots may be referred to as satellite time slots and serve to detect the single-photon states ($|s>_A|s>_B$) and ($|l>_A|l>_B$) of the third and the first paths, respectively. The middle time slot serves to detect the single-photon states ($|l>_A s>_B$) and ($|s>_A|l>_B$) of the second path.

Among the photons arriving at the device of Bob 200, a half of the photons is observed within the middle time slot and overlaps with one another on the 3 dB coupler 15 to cause the interference to occur and to be sent to both the ports D0 and D1.

On the other hand, the remaining half of the photons arrives within the left and the right satellite time slots but is unconditionally ignored in Bob 200.

Anyway, Bob 200 carries out operation in synchronism with a transmission period of each light pulse of the light source 1 in Alice 100 to detect whether or not a photon is received in the middle time slot. In addition, Bob 200 records which one of the ports or photon detectors 16 and 17 detects the photon. The probability of detecting, at the detector 16 of the port D0, the photon arriving within the middle time slot is given due to the interference by;

$$P(D0)=(1/2)(1+\cos(\theta_A-\theta_B)). \quad (2)$$

Likewise, the probability of detecting, at the detector 17 of the port D1, the photon arriving within the middle time slot is given by;

$$P(D1)=(1/2)(1-\cos(\theta_A-\theta_B)). \quad (3)$$

Thus, both the above-mentioned probabilities are represented by a function of ($\theta_A-\theta_B$). From this fact, it is readily understood that the photon corresponding to ($\theta_A-\theta_B$)=0 or $\pi$ is directed to the detector 16 of the port D0 or the detector 17 of the port D1 at a deterministic probability of 1 while the photon corresponding to ($\theta_A-\theta_B$)=$\pi/2$ or $3\pi/2$ is directed to either detector 16 or 17 at a deterministic probability of 1/2.

Bob 200, namely, a normal receiver, communicates with Alice 100, namely, a normal transmitter through a public channel after quantum communication is finished, to collate records of the ports detecting the photons in the middle time slot (FIG. 2) with records of phase modulation values in Alice 100 and Bob 200. In consequence, it is possible to extract, from the whole of the records, the records corresponding to the photons that are subjected to the phase modulation of ($\theta_A-\theta_B$)=0, $\pi$, that are detected within the middle time slot on Bob's site, and that bring about the deterministic results. In this event, the phase modulation values $\theta_A$ of Alice that correspond to a common key may not be revealed. Thus, the extracted records are equal to a half of the whole records and specify a complete correlation between the records of the phase modulation values $\theta_A$ in Alice and the records of the photon detection ports in Bob. Accordingly, it is possible to share, between Alice and Bob, the secret key consisting of a series of random bits by appropriately assigning 0/1 to the phase modulation values $\theta_A$ and the photon detection records of Bob. Herein, it should be pointed out that the photon corresponding to ($\theta_A-\theta_B$)=$\pi/2$ or $3\pi/2$ is neglected in the conventional system, which also results in a reduction of photon utilization efficiency in Bob 200.

Any eavesdropper (abbreviated to Eve) can not share the phase modulation values $\theta_A$ and $\theta_B$ of Alice and Bob at each photon transmission time. In addition, Eve also cannot control Bob's detection operation of detecting the photon either within the middle time slot or within the satellite time slots. Accordingly, Eve cannot share, with Alice and Bob, records corresponding to the photons that are subjected to the phase modulation, such as ($\theta_A-\theta_B$)=0, $\pi$. Thus, the photons subjected to phase modulation ($\theta_A-\theta_B$)=0, $\pi$ are detected within the middle time slot in Bob on the photon transmission and brings about deterministic results.

In general, the strict proof has been also already made due to complementarity in quantum mechanics about the fact that a common key between Alice and Bob can be never eavesdropped by Eve without any trace when a transmission photon is a single photon. Eavesdropper's action causes an incomplete correlation to occur between records of phase modulation values $\theta_A$ in Alice and records of photon detection ports in Bob and brings about generation of an incomplete common key. In addition, it is also possible to restrict a maximum quantity of eavesdropping information by estimating a bit error rate (BER) of an incomplete common key in Alice and Bob. Furthermore, it is possible to generate a theoretically and unconditionally safe key from such an incomplete common key on the basis of a quantity of eavesdropping information. In this event, it is needless to say that use is made about a logical algorithm for error correction and improvement of secrecy.

As readily understood from the above, the conventional system ignores the photons arriving at the detectors of Bob within the left and right satellite time slots and only uses the photons arriving within the middle time slot. Accordingly, the photons arriving within the left and right time slots are useless. As a result, available efficiency of photons (photon utilization efficiency) arriving on Bob's site is reduced to 0.5. This means that an optical loss of 3 dB is unconditionally caused to occur on temporally selective observation.

Figure 3:
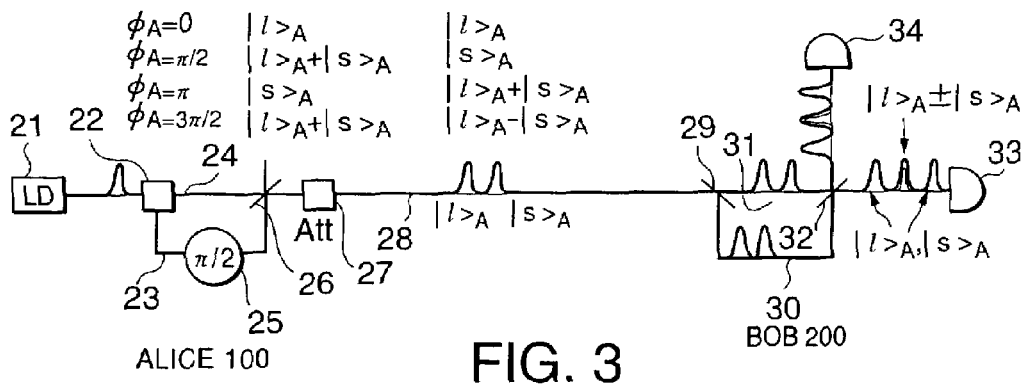
FIG. 3 shows a diagrammatical view for use in describing a quantum cryptography key distribution system according to a first embodiment of this invention.

Referring to FIG. 3, description will be made about a quantum cryptography key distribution system according to a first embodiment of this invention. The illustrated quantum cryptography key distribution system is used to share a secret key between a transmitter site (Alice) 100 and a receiver site (Bob) 200. Like in FIG. 1, the system is operable in accordance with the four state protocol BB84. Therefore, four non-orthogonal states are used which are represented by superposition of quantum wave packet states each consisting of a single photon with different time and space characteristics, as will become clear as the description proceeds.

In FIG. 3, Alice 100 has a light source 21 for periodically generating a sequence of coherent light pulses. In the example illustrated in FIG. 3, the light pulse sequence is given to a Mach-Zehnder interferometer switch 22 that will be described later in detail and is split or branched by the Mach- Zehnder interferometer switch 22 into a long arm 23 and a short arm 24 both of which forms an unbalanced Mach-Zehnder interferometer system.

As illustrated in FIG. 3, the long arm 23 of the unbalanced Mach-Zehnder interferometer system has an optical delay path 25 which corresponds to a one-quarter wavelength. Laser pulses that pass through the long arm 23 and the short arm 24 are coupled or combined together by a 3 dB coupler 26 and are attenuated by an attenuator 27 to faint light pulses having an average photon number of about 0.1. Such attenuated faint light pulses are transmitted through a quantum communication channel 28 to Bob 200. Thus, the attenuator 27 serves to output the attenuated faint light pulses as a quantum signal and may be referred to as an output device.

Herein, it is to be noted in connection with Alice 100 that each of the laser or light pulses periodically arriving from the light source 21 is subjected to phase modulation by the Mach-Zehnder interferometer switch 22. Such phase modulation is carried out by randomly selecting a value from four values $\phi_A$ of $0, \pi/2, \pi, 3\pi/2$. In consequence, the illustrated Alice transmits four quantum wave packet states (will be described later) to Bob 200 in the form of a quantum signal (a single photon) through the quantum communication channel 28 and simultaneously records phase modulation values therein. For brevity of description, the four quantum wave packet states may be simply called four quantum states.

Faint light pulses that arrive at Bob 200 are split or branched by a 3 dB coupler 29 to be delivered into a long arm 30 and a short arm 31 both of which form an unbalanced Mach-Zehnder interferometer system. Very weak or faint light pulses passing through the long arm 30 and the short arm 31 are coupled or combined together by a 3 dB coupler 32 to be distributed to two ports. Each output light pulse is given from each port to each of single photon detectors 33 and 34. Bob 200 records photon detection results of the single photon detectors 33 and 34 in a manner to be described later in detail.

In the system shown in FIG. 3, the quantum signal or photon is transmitted from Alice 100 and received by Bob 200 through first, second, and third paths that have been already described in conjunction with FIG. 1.

Figure 4:
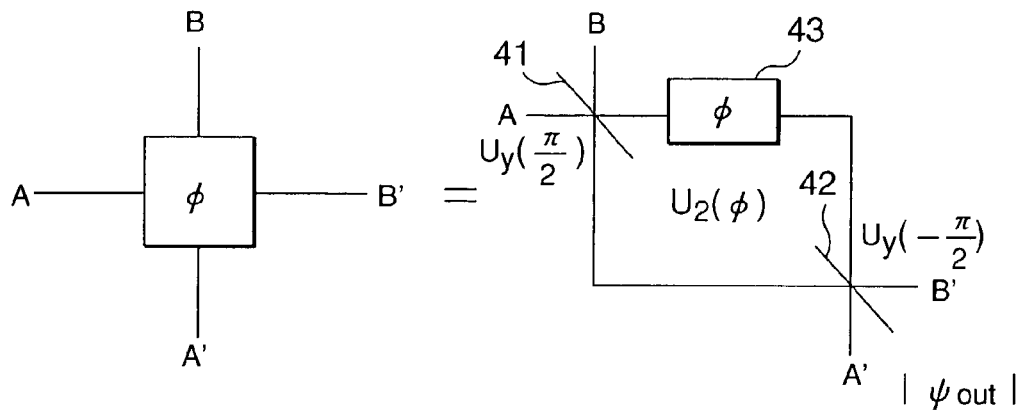
FIG. 4 shows a view for describing a Mach-Zehnder interferometer switch that is used in the system illustrated in FIG. 3.

Referring to FIG. 4, the Mach-Zehnder interferometer switch 22 will be illustrated which is similar in structure to a light amplitude modulator. Specifically, the illustrated Mach-Zehnder interferometer switch 22 has input ports A/B, output ports A'/B', and 3 dB couplers 41 and 42 both of which forms a balanced Mach-Zehnder interferometer system having two light paths. At least one of the two light paths is provided with a phase modulator 43. An electro-optic device, such as a LN (lithium niobate) modulator, can be used as the phase modulator 43.

It is assumed that a coherent light beam given to the input port A has a complex amplitude represented by $\alpha$ and no input signal is given to the input port B by opening the same and that the phase modulator 43 is given a voltage such that a phase shift $\phi_A = \phi$. Under the circumstances, a ratio of output light amplitudes at the output ports (A'/B') is given by $\alpha \cos(\phi/2)/i\alpha \sin(\phi/2)$.

From this fact, it is readily understood that the ratio of the output light amplitudes at the output ports A'/B' becomes $(\alpha/0)$ when the voltage is impressed such that the phase shift $\phi_A$ becomes equal to 0. Likewise, when the voltage is impressed to the phase modulator 43 such that the phase shift $\phi_A$ becomes equal to $\pi$ and $\pi/2$, the ratio of the output light amplitudes at the output ports A'/B' is given (0/$i\alpha$) and ($\alpha/\sqrt{2}/i\alpha/\sqrt{2}$), respectively. Moreover, when the voltage is given such that the phase shift $\phi_A = 3\pi/2$, the ratio of the output light amplitudes at the output ports A'/B' is given by ($-\alpha/\sqrt{2}/i\alpha/\sqrt{2}$).

In other words, the Mach-Zehnder interferometer switch 22 should have the above-mentioned input/output operating characteristics. However, it is to be noted that such a Mach-Zehnder interferometer switch 22 is practically implemented by designing a path difference between the long and the short arms and characteristics of the 3 dB couplers 41 and 42.

Referring back to FIG. 3, the output ports A'/B' of the Mach-Zehnder interferometer switch 22 mentioned above are connected to the long arm 23 and the short arm 24 both of which are operable as the unbalanced Mach-Zehnder interferometer system.

Now, description will be directed to a principle of the quantum cryptography key distribution device according to this invention for a better understanding of this invention.

In FIGS. 3 and 4, let the coherent light pulse with the complex amplitude a be given from the input port A of the Mach-Zehnder interferometer switch 22. In this event, Alice 100 generates faint light pulses that are defined by the quantum states. When $\phi_A$ is equal to either one of $0, \pi/2, \pi, 3\pi/2$ and photon absence states are ignored such that no photon is measured, the quantum states of the faint light pulses are given by;

$$|\Psi(\phi_A)\rangle = |l\rangle_A \phi_A = 0$$

$$(|l\rangle_A + |s\rangle_A)/(\sqrt{2}) \phi_A = \pi/2$$

$$|s\rangle_A \phi_A = \pi$$

$$(|l\rangle_A - |s\rangle_A)/(\sqrt{2}) \phi_A = 3\pi/2 \quad (4)$$

In the above-mentioned formulae (4), omission is made about phase factors because they are not so significant in the following description. In the formulae 4, $s\rangle_A$ and $l\rangle_A$ are representative of single photon packets which pass through the long and the short arms 23 and 24 of Alice, respectively, and which are localized or dispersed in time and space. As illustrated in FIG. 3, the $|s\rangle_A$ is localized on or adjacent to Bob 200 side in comparison with the $|l\rangle_A$ by the path difference between the long and the short arms 23 and 24.

Among the quantum states corresponding to $\phi_A = 0, \pi/2, \pi, 3\pi/2$, $|\Psi(0)\rangle = |l\rangle_A$ and $|\Psi(\pi)\rangle = |s\rangle_A$ are orthogonal to each other while are also orthogonal to each other.

This shows that each state pair or set of $\{|\Psi(0)\rangle, |\Psi(\pi)\rangle\}$ and $\{|\Psi(\pi/2)\rangle, |\Psi(3\pi/2)\rangle\}$ forms a complete base system of two dimensional quantum state space concerned with the quantum wave packet states, such as $|s\rangle_A$ and $|l\rangle_A$, each of which is composed of a single photon having different time and space localized characteristics. Moreover, each complete base system is non-orthogonal with each other. Accordingly, it is possible to apply the BB84 protocol to the above-mentioned four quantum states.

Now, description will be made about the operation principle of Bob that is illustrated in FIG. 3 and that has an unbalanced Mach-Zehnder interferometer system which has the same path difference between long and short arms as the path difference of Alice. Under the circumstances, it should be noted that interference takes place between quantum states that are overlapped with each other on the 3 dB coupler 32 in time and space and that are specified by $\{|\Psi(\pi/2)\rangle, |\Psi(3\pi/2)\rangle\}$.

More specifically, consideration will be made about the quantum state $\{|\Psi(\pi/2)\rangle, |\Psi(3\pi/2)\rangle\}$. In this event, the photon received by Bob 200 takes the single-photon state $|l\rangle_A|s\rangle_B$ that passes through both the long arm 23 of Alice's interferometer system and the short arm 31 of Bob's interferometer system. Another photon takes the single-photon state $|s\rangle_A|l\rangle_B$ that passes through both the short arm 24 of Alice's interferometer system and the long arm 30 of Bob's interferometer system. It is to be found out that both the former single-photon state $|1>_A|s>_B$ is caused to interfere with the latter single-photon state $|s>_A|1>_B$ because of the same transmission path length. As a result, a photon certainly appears on either one of the output ports D0 and D1 in dependency upon each of the single-photon states.

It is to be noted that the photon arriving at the Bob 200 is equal to a half of the photon specified by the state $\{|\Psi(\pi/2)>, |\Psi(3\pi/2)>\}$ and is observed by Bob 200 within the middle time slot illustrated in FIG. 2. This is similar to the conventional system described in FIG. 1. As to the photon observed within the middle time slot, the phase modulation values of Alice have a correlation of 100% with the ports of detecting the photon.

The remaining half of photon that arrives at Bob 200 and that is represented by the state $\{|\Psi(\pi/2)>, |\Psi(3\pi/2)>\}$ is received within the satellite time slots of the right and left hand sides of the middle time slot in FIG. 2. However, no correlation of the remaining half of the photon specified by the state $\{|\Psi(\pi/2)>, |\Psi(3\pi/2)>\}$ is observed between the phase modulation values of Alice and the output ports of detecting the photon. In this case, Bob 200 ignores the detection results of the photon arriving at Bob 200 and discards the detection results.

On the other hand, the photon specified by the state set of $\{|\Psi(0)>, |\Psi(\pi)>\}$ is also observed within each of the middle and the satellite time slots illustrated in FIG. 2. This is because such a photon is received through both the long and the short arms 30 and 31 of Bob 200. As regards the photon arriving within each of the left hand and the right hand satellite time slots, a detection time slot (either one of the left and the right hand time slots) has a correlation of 100% with the phase modulation values in Alice. Such a photon in the state set of $\{|\Psi(0)>, |\Psi(\pi)>\}$ is received by Bob 200 and corresponds to a half of the photon arriving at Bob 200.

The remaining half of the photon arrives at the middle time slot (FIG. 2) and is concerned with the state set of $\{|\Psi(0)>, |\Psi(\pi)>\}$. However, such a photon concerned with the state set of $\{|\Psi(0)>, |\Psi(\pi)>\}$ exhibits no correlation between the phase modulation values of Alice and the detection ports of the photon. Therefore, Bob neglects the photon concerned with the state set of $\{|\Psi(0)>, |\Psi(\pi)>\}$ and discards the detection values from the right and left hand satellite time slots.

Bob 200 is operated in synchronism with the light pulse transmission period of the light source 1 and records the photons not only within the middle time slot but also within the left and the right hand side satellite time slots.

Subsequently, Bob 200, namely, the normal receiver, communicates with Alice 100 through the public channel after quantum communication is finished so as to collate the photon detection records with the phase modulation values of Alice 100. In this case, Alice 100 reveals the transmission light pulses belong to either set of $\{|\Psi(0)>, |\Psi(\pi)>\}$ and $\{|\Psi(\pi/2)>, |\Psi(3\pi/2)>\}$ without revealing the phase modulation values $\phi_A$ themselves. This means that Alice 100 indicates whether the phase modulation values $\phi_A$ belong to either set of $\{0, \pi\}$ and $\{\pi/2, 3\pi/2\}$.

When $\phi_A=\{0,\pi\}$, Bob 200 extracts photon records which are detected within the satellite time slots and which will be called first photon records. On the other hand, when $\phi_A=\{\pi/2, 3\pi/2\}$, he extracts photon records which are detected within the middle time slots and which will be called second photon records.

Herein, it is to be noted in connection with the first photon records that the phase modulation values $\phi_A$ of Alice 100 are correlated with left or right ones of the satellite time slots in which the photons are detected. In connection with the second photon records, the phase modulation values $\phi_A$ of Alice 100 are correlated with either one of the ports D0 and D1 at which the photons are detected. In this situation, if bit 0/1 may be appropriately assigned to the phase modulation values and the time slots/ports, it is understood that a secret key which is composed of a random bit sequence can be shared between Alice and Bob.

Security of this system depends on the security of the four state protocol BB84 like in the conventional system.

As mentioned above, the quantum cryptography key distribution system according to this invention uses not only the photons arriving within the middle time slots (FIG. 2) but also the photons arriving within the left and the right satellite time slots which have been discarded unconditionally in the conventional system. This shows that the system according to this invention can establish twice the photon utilization efficiency in comparison with the conventional system and can reduce the loss of the photons. It is to be noted that the above-mentioned efficiency corresponds to a maximum efficiency which can be realized by the use of the four state protocol BB84.

Furthermore, Bob 200 implemented by this invention dispenses with any phase modulator that has been essentially used in the receiver side (FIG. 1) of the conventional system and that is expensive. Therefore, Bob 200 according to this invention is inexpensive because of no inclusion of any expensive phase modulator and can avoid an optical loss caused by such a phase modulator. Instead, it is noted that Bob 200 according to this invention needs to record photon detection information related to the time slots in which photons are received and detected. This means that Bob according to this invention should include a device for accurately detecting and recording the photons.

Figure 5:
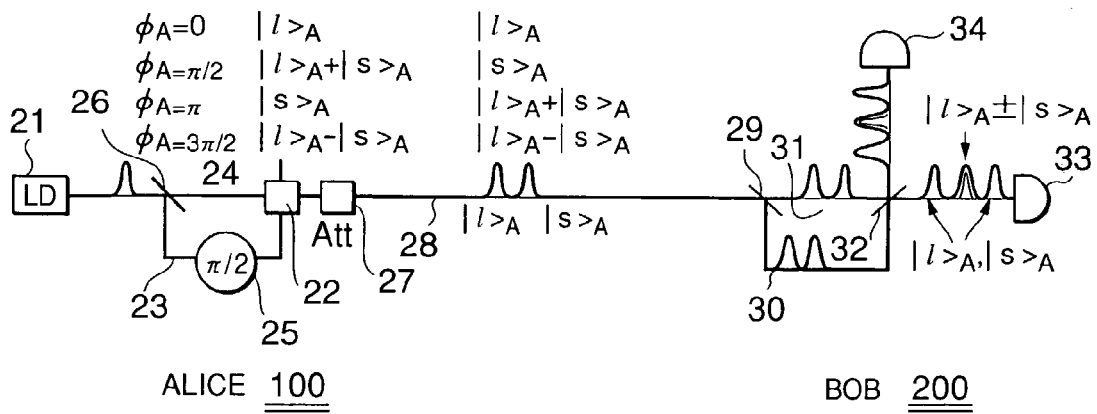
FIG. 5 shows a view for use in describing a quantum cryptography key distribution system according to a second embodiment of this invention.

Referring to FIG. 5, a quantum cryptography key distribution system according to a second embodiment of this invention is similar in structure to FIG. 3 except that substitution is made between the Mach-Zehnder interferometer switch 22 and the 3 dB coupler 26 in FIG. 5. This shows that the Mach-Zehnder interferometer switch 22 is located at an output side of Alice 100. The illustrated system can be operated in the same manner as that illustrated in FIG. 3 on the basis of the same principle and will not be described any longer.

Figure 6:
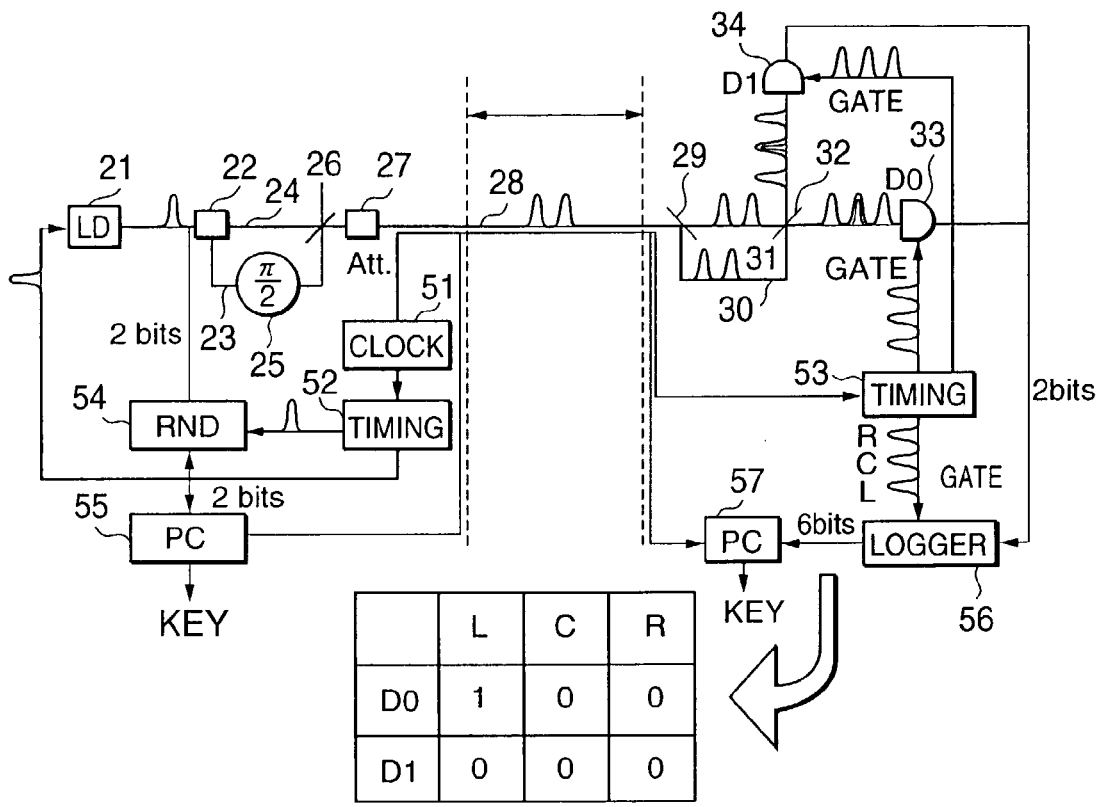
FIG. 6 shows a block diagram for use in describing the system illustrated in FIG. 3 in detail.
Figure 7:
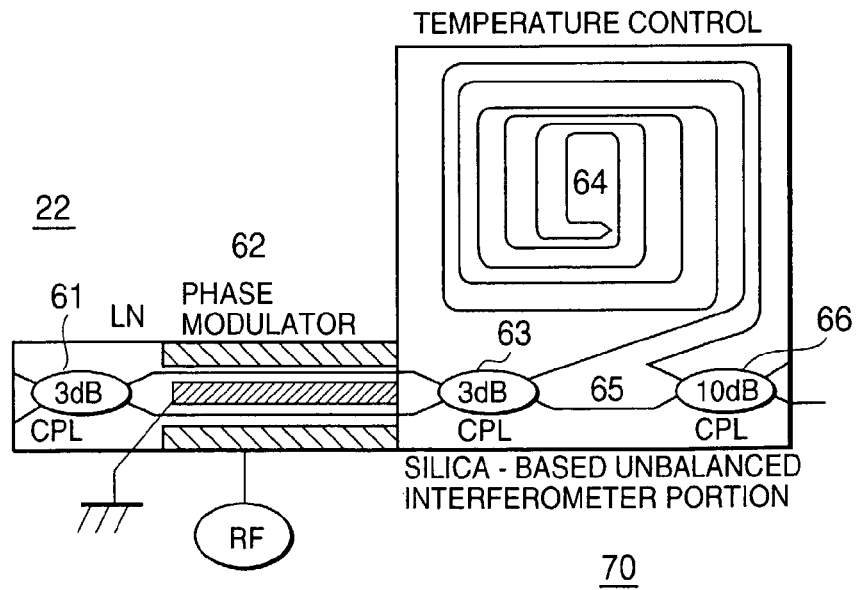
FIG. 7 shows a structural view for use in describing a part of a transmitter site (Alice) illustrated in FIG. 6.

Referring to FIGS. 6 and 7, the quantum cryptography key distribution system according to the first embodiment will be described more in detail. Alice 100 and Bob 200 illustrated in FIG. 6 comprise elements 21 to 34 that are similar to those shown in FIG. 3 and that have already been mentioned above. Therefore, description will be omitted in connection with the elements 21 to 34.

In addition, the illustrated Alice 100 further comprises a clock signal generator 51, a timing controller 52, a random pulse generator (RND) 54, and a computer (PC) 55. On the other hand, the illustrated Bob 200 further comprises a timing controller 53, a recording device (namely, a data logger) 56, and a computer (PC) 57.

In the example illustrated in FIG. 6, the clock signal generator 51 of Alice 100 generates a sequence of clock pulses having a repetition frequency determined for the system. The clock pulse sequence is delivered from the clock signal generator 51 to the timing controller 52 of Alice (simply referred to as Alice's timing controller) and to the timing controller 53 of Bob (called Bob's timing controller). The clock pulse sequence may be wave-length multiplexed and thereafter sent to the Alice's timing controller 52 and to the Bob's timing controller 53 through the quantum channel 28 in a multiplexed manner. Alternatively, it is possible in principle to independently install high precision clock generators, such as atomic clocks, in both Alice 100 and Bob 200.

In the illustrated system, the Alice's timing controller 52 supplies both the random pulse generator (RND) 54 and the light source 21 with a timing pulse. The timing pulse is synchronized in time with a light pulse generated by the light source (LD) 21. In consequence, the light pulse is phase modulated in synchronism with the timing pulse when it passes through the Mach-Zehnder interferometer switch 22.

In this event, the random pulse generator 54 generates a pair (two bits) of random pulses in the form of a random numerical data sequence of two bits in response to the timing pulse. Each pair of the random pulses specifies either one of four values (0, $\pi/2$, $\pi$, $3\pi/2$) and is sent to the Mach-Zehnder interferometer switch 22 which is periodically and successively given the light pulse from the light source 21. Under the circumstances, the Mach-Zehnder interferometer switch 22 phase modulates each light pulse by one of the phase modulation values selected from the four values (0, $\pi/2$, $\pi$, and $3\pi/2$). Simultaneously, the random numerical data sequence of two bits are stored in the Alice's computer 55.

On the other hand, the Bob's timing controller 53 generates three continuous pulse series or a triplet of pulses having a time interval that is equal to a difference between delay times of the long and the short arms included in the unbalanced Mach-Zehnder interferometer systems of Alice 100 and Bob 200. In other words, the three continuous pulses are generated at a period equal to a reciprocal of the clock repetition frequency and are given to the single photon detectors 33 and 34 as gate signals in synchronism with each arrival time instant of the single photon plackets.

Each of the single photon detectors 33 and 34 is put into an active state only when each gate signal is given thereto. Otherwise, it is kept in an inactive state. Each single photon detector 33 and 34 produces a detection signal when the photon arrives during its active state and does not produce any detection signal during its inactive state.

The detection signals are given from both the single photon detectors 33 and 34 to the recording device 56 to be stored therein. In this example, the recording device 56 discriminates high and low levels as "1" and "0", respectively, and stores the detection signals as a bit data sequence of two bits. The illustrated recording device 56 is supplied as the gate signals with the above-mentioned three bit series from the Bob's timing controller 53. The gate signals of three continuous bit series are given in synchronism with the detection signals, namely, the bit data sequence of two bits sent from the single photon detectors 33 and 34. The recording device 56 discriminates high and low levels of the three bit series as "1" and "0", respectively.

Responsive to the above-mentioned bit sequences or series, the recording device 56 executes a logic OR operation between the detection signals sent from the single photon detectors 33 and 34 and the gate signals to form a table as illustrated in FIG. 6. The table stands for a relationship among the detection time slots (L, C, R), the ports D0, D1, and presence or absence of the photons and is produced as table information of six bits in synchronism with the clock pulses. Such table information is asynchronously stored in the Bob's computer 57.

In the above-mentioned manner, a quantum signal is transmitted from Alice 100 to Bob 200. After transmission of the quantum signal is finished, the Alice's computer 55 is loaded with the random numerical data series of two bits corresponding to the phase modulation values $\Phi_A$ while the Bob's computer 57 is loaded with the table information concerned with presence or absence of the photon at every detection time slot. In this situation, information exchange is carried out between Alice and Bob with reference to the stored data and the table information. In this event, only the information mentioned above is exchanged between Alice and Bob. On the information exchange, a wavelength multiplexing technique may be executed through the quantum channel 28 like transmission of the clock pulses. By this information exchange, Alice and Bob can extract a raw key that serves as a seed for obtaining an end key.

In FIG. 7, the Mach-Zehnder interferometer switch 22 of Alice is combined with the unbalanced Mach-Zehnder interferometer system depicted by 70. The illustrated Mach-Zehnder interferometer switch 22 is structured by a first 3 dB coupler (CPL) 61 located on an input side of Alice, an optical phase modulator 62, and a second 3 dB coupler (CPL) 63 located on an output side. The optical phase modulator 62 may be formed by the use of an electro-optic element, such as a lithium niobate (LN) element.

On the other hand, the unbalanced Mach-Zehnder interferometer system 70 has a long arm 64 and a short arm 65 both of which are manufactured by a planar lightwave circuit (PLC) technique by the use of quartz or silica. A lightwave formed by silica has a polarization non-dependence property and a polarization maintaining property and therefore can maintain interference in tact. Such a lightwave dispenses with specific polarization control operation.

In addition, it is possible to control a path difference between the long and the short arms 64 and 65 by adjusting a temperature of the device.

The illustrated unbalanced Mach-Zehnder interferometer system 70 further includes a 10 dB coupler 66 so as to compensate for asymmetry of an optical loss caused to occur in the silica lightwave.

Figure 8:
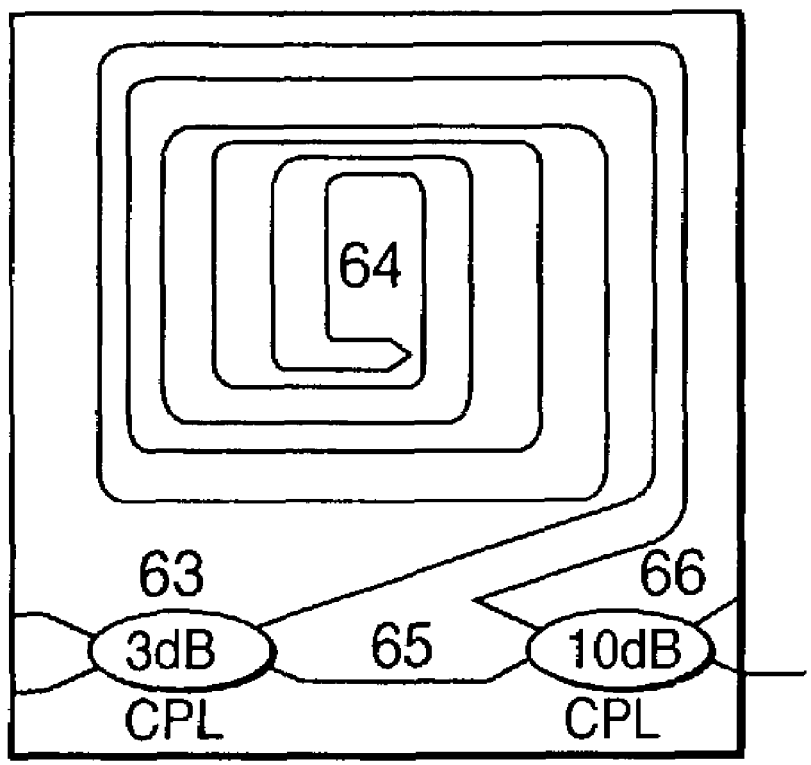
FIG. 8 shows a structural view for describing a structure of a Mach-Zehnder interferometer system used in the receiver site (Bob) of FIG. 6.

Referring to FIG. 8, illustrated is an unbalanced Mach-Zehnder interferometer system or portion 80 which can be used in Bob and which is formed by a subset similar to the unbalanced interferometer system 70 shown in FIG. 7. Therefore, the illustrated system 80 in Bob is structured by the use of a silica-based lightwave circuit technique and has first and second 3 dB couplers 63 and 66, a long arm 64, and a short arm 65, all of which are identical with those illustrated in FIG. 7 and which will not be described any longer.

The system illustrated in FIG. 6 is described as an example in connection with the system according to the first embodiment of this invention alone. However, the system (FIG. 5) according to the second embodiment can be readily implemented by modifying the system illustrated in FIG. 6. For example, the elements 51 to 57 may be added to the system illustrated in FIG. 5 in a manner similar to FIG. 6 and therefore, description will be omitted any longer.

In any event, the system according to this invention can accomplish twice the photon utilization efficiency in Bob in comparison with the conventional system. Such efficiency corresponds to a maximum efficiency realized by the four state protocol BB84, which can reduce an optical loss. Moreover, an expensive phase modulator is not used in Bob or the receiver side and, as a result, the receiver can be manufactured at a low cost. In addition, absence of such a phase modulator can avoid any optical loss caused by such a phase modulator.

While this invention has thus far been described in conjunction with a few embodiments thereof, it will readily be possible for those skilled in the art to put this invention into practice in various other manners. For example, the interferometer element may be, for example, a bulk optical element or an optical fiber in lieu of the lightwave element. Moreover, this invention is applicable to a system or method for transmitting and receiving a general quantum signal.

What is claimed is:

1. A quantum cryptography key distribution system for use in sharing a secret key between a transmitter site and a receiver site on the basis of a quantum cryptography key distribution protocol of four non-orthogonal states that are represented by superposition of quantum wave packet states each consisting of a single photon with different time and space characteristics, the transmitter site comprising:

an unbalanced Mach-Zehnder interferometer system composed of two different optical paths of unequal lengths, a light splitting portion, and a light coupling portion;

wherein either one of the light splitting portion and the light coupling portion is a variable branching-ratio optical coupler composed of a balanced Mach-Zehnder interferometer system having two optical paths of an equal length and a phase modulator which is disposed in one of the two optical paths and which is controllable by an applied voltage;

wherein the unbalanced Mach-Zehnder interferometer system and the balanced Mach-Zehnder interferometer system constitute a serially coupled interferometer system;

wherein the transmitter site transmits, through a quantum channel to the receiver site, the photon which is specified by single photon packet states selected from $(|s>_A, |l>_A)$ and $(|l>_A+|s>_A, |l>_A-|s>_A)$ that are different in time and space characteristics from each other in response to a pair of phase modulation values that are randomly selected from $(0,\pi)$ and $(\pi/2, 3\pi/2)$ to phase modulate a light pulse:

wherein the transmitter site produces, as the photon, single photons that correspond to the phase modulation values of each pair, the receiver site comprising:

photon detectors; and a recording device for recording photon detection times at which the photon is received by each of the photon detectors.

2. A quantum cryptography key distribution system as claimed in claim 1, wherein the balanced Mach-Zehnder interferometer system is located at the light splitting portion.

3. A quantum cryptography key distribution system as claimed in claim 1, wherein the receiver site comprises a Mach-Zehnder interferometer portion free from a phase modulator.

4. A quantum cryptography key distribution system as claimed in claim 3, wherein the Mach-Zehnder interferometer portion of the receiver site comprises a long arm, a short arm, a first coupler located on an input side, and a second coupler located on an output side;

the photon detectors being for detecting the photon sent through the second coupler.

5. A quantum cryptography key distribution system as claimed in claim 4, wherein the photon detectors are supplied with gate signals composed of three continuous pulses to define three time slots for detecting the photon and detects the photon only when the gate signals are given.

6. A quantum cryptography key distribution system as claimed in claim 5, wherein the three time slots are composed of a middle time slot and satellite time slots before and after the middle time slot;

the photon of the single photon packet states $(|l>_A+|s>_A, |l>_A-|s>_A)$ being received within the middle time slot while the photon of the single photon packet state $(|s>_A, |l>_A)$ is received within the satellite time slots.

7. A quantum cryptography key distribution system as claimed in claim 6, wherein the recording device in the receiver site records not only the photon received by the receiver site but also the middle and the satellite time slots as the photon detection times.

8. A quantum cryptography key distribution system as claimed in claim 1, wherein the balanced Mach-Zehnder interferometer system is located at the light coupling portion.

9. A quantum cryptography key distribution system as claimed in claim 8, wherein the receiver site comprises a Mach-Zehnder interferometer portion free from a phase modulator.

10. A quantum cryptography key distribution system as claimed in claim 9, wherein the Mach-Zehnder interferometer portion of the receiver site comprises a long arm, a short arm, a first coupler located on an input side, and a second coupler located on an output side;

the photon detectors being for detecting the photon sent through the second coupler.

11. A quantum cryptography key distribution system as claimed in claim 10, wherein the photon detectors are supplied with gate signals composed of three continuous pulses to define three time slots for detecting the photon and detects the photon only when the gate signals are given.

12. A quantum cryptography key distribution system as claimed in claim 11, wherein the three time slots are composed of a middle time slot and satellite time slots before and after the middle time slot;

the photon of the single photon packet states $(|l>_A+|s>_A, |l>_A-|s>_A)$ being received within the middle time slot while the photon of the single photon packet state $(|s>_A, |l>_A)$ is received within the satellite time slots.

13. A quantum cryptography key distribution system as claimed in claim 12, wherein the recording device in the receiver site records not only the photon received by the receiver site but also the middle and the satellite time slots as the photon detection times.

14. A transmitter site for use in a quantum cryptography key distribution system to transmit a quantum signal to a receiver site by using four non-orthogonal states of single photons, the transmitter site comprising:

an unbalanced Mach-Zehnder interferometer system composed of two different optical paths, a light splitting portion, and a light coupling portion;

wherein either one of the light splitting portion and the light coupling portion is a variable branching-ratio optical coupler composed of a balanced Mach-Zehnder interferometer system having two optical paths of an equal length and a phase modulator which is disposed in one of the two optical paths and which is controllable by an applied voltage;

wherein the unbalanced Mach-Zehnder interferometer system and the balanced Mach-Zehnder interferometer system constitute a serially coupled interferometer system;

wherein the phase modulator is supplied with a pair of phase modulation values randomly selected from $(0,\pi)$ and $(\pi/2, 3\pi/2)$ to phase modulate a light pulse;

wherein the transmitter site comprises an output device which transmits, through a Quantum channel to the receiver site, the Quantum signal which is specified by the single photon packet states selected from $(|s>_A, |l>_A)$ and $(|l>_A+|s>_A, |l>_A-|s>_A)$ that are different in time and space characteristics from each other in response to the phase modulation values $(0,\pi)$ and $(\pi/2, 3\pi/2)$; and wherein the transmitter site produces, as the Quantum signal, the single photons that correspond to the phase modulation values of each pair.

15. A receiver site which is communicable with the transmitter site claimed in claim 14, wherein the receiver site comprises a Mach-Zehnder interferometer portion responsive to the quantum signal and free from a phase modulator to produce a photon; and photon detectors for detecting the photon from the Mach-Zehnder interferometer portion.

16. A receiver site as claimed in claim 15, wherein the Mach-Zehnder interferometer portion of the receiver site comprises a long arm, a short arm, a first coupler located on an input side, and a second coupler located on an output side;

the photon detectors being for detecting the photon sent through the second coupler.

17. A receiver site as claimed in claim 16, wherein the photon detectors are supplied with gate signals composed of three continuous pulses to define three time slots for detecting the photon and detects the photon only when the gate signals are given.

18. A receiver site as claimed in claim 17, wherein the three continuous time slots are composed of a middle time slot and satellite time slots before and after the middle time slot;

the photon of the single photon packet states ($|1>_A+|s>_A$, $|1>_A-|s>_A$) being received within the middle time slot while the photon of the single photon packet state ($|s>_A$, $|1>_A$) is received within the satellite time slots.

19. A receiver site as claimed in claim 18, wherein the recording device in the receiver site records not only the photon received by the receiver site but also the middle and the satellite time slots as the photon detection times.

* * * * *